US008146818B2

(12) United States Patent
Nakamura

(10) Patent No.: US 8,146,818 B2
(45) Date of Patent: Apr. 3, 2012

(54) APPARATUS AND METHOD FOR SYMBOL INFORMATION READING

(75) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 368 days.

(21) Appl. No.: 12/415,431

(22) Filed: Mar. 31, 2009

(65) Prior Publication Data

US 2009/0242643 A1    Oct. 1, 2009

(30) Foreign Application Priority Data

Mar. 31, 2008  (JP) ................................ 2008-090583
Jul. 14, 2008   (JP) ................................ 2008-182184

(51) Int. Cl.
*G06K 7/10* (2006.01)
(52) U.S. Cl. .......... 235/462.06; 235/462.01; 235/462.09
(58) Field of Classification Search ............. 235/462.08, 235/462.01, 462.09, 462.12
See application file for complete search history.

(56) References Cited

U.S. PATENT DOCUMENTS

| 5,468,945 A | * | 11/1995 | Huggett et al. | ........... 235/462.02 |
| 5,512,739 A | * | 4/1996 | Chandler et al. | .......... 235/462.09 |
| 5,979,768 A | * | 11/1999 | Koenck | .......................... 235/470 |
| 6,176,428 B1 | * | 1/2001 | Joseph et al. | ............... 235/462.1 |
| 6,293,466 B1 | * | 9/2001 | Fujita et al. | .............. 235/462.02 |

FOREIGN PATENT DOCUMENTS

| JP | 4-225487 A | 8/1992 |
| JP | 2004-252897 A | 9/2004 |

* cited by examiner

*Primary Examiner* — Ahshik Kim
(74) *Attorney, Agent, or Firm* — Cantor Colburn LLP

(57) ABSTRACT

A symbol information reading apparatus may include an imaging element; an image memory structured to store image data; a position detecting processor structured to fetch the image data and structured to detect a position of symbol information. The position detecting processor may include a temporary area judgment unit that structured to calculate a variation of brightness, and structured to judge a temporary area having a possibility of corresponding to the symbol information; a correlation map creating unit that structured to calculate correlation between areas neighboring in a direction perpendicular to the scanning direction, and structured to create a map showing an area provided with large correlation values; a labeling unit that structured to check presence of a basic barcode on the correlation map, and structured to label an area judged as having the basic barcode; and a position determining unit that structured to detect a position of the symbol information recorded.

10 Claims, 8 Drawing Sheets

Fig. 6

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 1 | 1 | 0 | 0 | 0 | 0 | 0 |
| 0 | 1 | 1 | 0 | 1 | 1 | 1 | 0 |
| 0 | 0 | 0 | 0 | 1 | 1 | 1 | 0 |
| 0 | 0 | 0 | 0 | 1 | 1 | 1 | 0 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 1 | 1 | 0 |
| 0 | 0 | 0 | 0 | 2 | 2 | 2 | 0 |
| 0 | 0 | 0 | 0 | 1 | 1 | 1 | 0 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 1 | 1 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 1 | 0 |
| 0 | 0 | 0 | 2 | 0 | 0 | 2 | 0 |
| 0 | 0 | 0 | 1 | 0 | 0 | 1 | 0 |
| 0 | 0 | 0 | 0 | 0 | 0 | 0 | 0 |

| 0 | 0 | 0 | 0 | 0 | 0 | 0 | 0 |
|---|---|---|---|---|---|---|---|
| 1 | 0 | 0 | 0 | 1 | 0 | 0 | 0 |
| 2 | 0 | 0 | 0 | 2 | 0 | 0 | 0 |
| 1 | 0 | 0 | 0 | 1 | 0 | 0 | 0 |
| 0 | 0 | 0 | 0 | 0 | 0 | 0 | 0 |
| 0 | 1 | 1 | 0 | 0 | 0 | 0 | 0 |
| 0 | 1 | 1 | 0 | 1 | 1 | 1 | 0 |
| 0 | 0 | 0 | 0 | 2 | 2 | 2 | 0 |
| 0 | 0 | 0 | 0 | 1 | 1 | 1 | 0 |
| 0 | 0 | 0 | 0 | 0 | 0 | 0 | 0 |

APPARATUS AND METHOD FOR SYMBOL INFORMATION READING

CROSS REFERENCE TO RELATED APPLICATIONS

The present application claims priority under 35 U.S.C. §119 to Japanese Application No. 2008-090583 filed Mar. 31, 2008 and Japanese Application No. 2008-182184 filed Jul. 14, 2008, the entire contents of each of which are incorporated herein by reference.

FIELD OF THE INVENTION

The present invention relates to apparatuses and methods for reading symbol information that optically read symbol information such as a barcode.

BACKGROUND

Conventionally, barcodes have been used as measures for providing paper or plastic media with specific information and recognizing the information automatically. For commodity management and logistics, information of barcodes provided on commodities is read by using a barcode reader such as a laser scanner and a CCD camera. Coming up in these years is a new type of barcode reader that scans a whole surface of an ID card for capturing an image and recognizes a barcode based on the image, while a personal number being recorded as the barcode on the ID card. For this type of barcode reader, it is important to accurately detect a barcode symbol from a 2D image space. Some detection methods are known for the detecting process (Refer to Patent Documents 1 and 2).

In a process of Patent Document 1, by using a degree of similarity of derivatives of scanning lines parallel in a local region of an image space as an evaluation value, it is judged whether the region includes a barcode image or not. The derivatives are derived by differential operation. Meanwhile, in a process of Patent Document 2, a differential waveform of a candidate area possibly including a barcode is calculated for quantifying some feature quantities included in the waveform, and it is judged according to the quantified values whether the region includes a barcode image or not. Also in the latter case, the differential waveform is calculated by differential operation.

[Patent Document 1]
Japanese Unexamined Patent Application Publication No. 4-225487
[Patent Document 2]
Japanese Unexamined Patent Application Publication No. 2004-252897

Unfortunately, the processes disclosed by Patent Documents 1 and 2 require complicated calculations including differential operations for identifying a position of a barcode symbol, as described above, so that a lot of computations are needed. That may result in an obstacle to process time shortening. Meanwhile, a high-performance arithmetic element can be used for shortening the process time. However, such an arithmetic element is costly, and may lead to an increased cost of the entire reader as a result.

SUMMARY

At least an embodiment of an apparatus and method for reading symbol information enables reduction of computations required for reading symbol information such as a barcode.

To achieve the above, at least an embodiment of an apparatus and method for reading symbol information provides the following aspects.

(1) An apparatus for reading symbol information including: an imaging means for capturing an image of a medium on which symbol information is recorded; an image memory for storing image data of the medium captured by the imaging means; and a position detecting processor for fetching the image data and detecting a position of the symbol information recorded on the medium; wherein the position detecting processor includes: a temporary area judgment unit that calculates a variation of brightness along a scanning direction of scanning lines of the symbol information in a prescribed area of the image data, and judges a temporary area having a possibility of corresponding to the symbol information; a correlation map creating unit that calculates correlation between areas neighboring in a direction perpendicular to the scanning direction of the scanning lines in the temporary area, and creates a map showing an area provided with large correlation values; a labeling unit that checks presence of a basic barcode on the correlation map, and labels an area judged as having the basic barcode; and a position determining unit that detects a position of the symbol information recorded on the medium according to the labeled area.

At least an embodiment of the apparatus for reading symbol information includes: the imaging means, the image memory, and the position detecting processor that fetches the image data out of the image memory and detects the position of the symbol information recorded on the medium. The temporary area judgment unit included in the position detecting processor calculates a variation of brightness (for example, variance, or standard deviation) along the scanning direction of scanning lines of the symbol information in the prescribed area of the image data, and judges a temporary area having a possibility of corresponding to the symbol information. The correlation map creating unit included in the position detecting processor calculates correlation between areas neighboring in a direction perpendicular to the scanning direction of the scanning lines in the temporary area, and creates a map showing an area provided with large correlation values. The labeling unit included in the position detecting processor checks presence of a basic barcode (source barcode pattern) on the correlation map, and labels an area judged as having the basic barcode. The position determining unit included in the position detecting processor detects a position of the symbol information recorded on the medium according to the labeled area. Therefore, the position of the symbol information recorded on the medium can be detected without any differential operation, and consequently computations for reading the symbol information can be reduced.

(2) The apparatus for reading symbol information: wherein the imaging means is a contact-type one-dimensional imaging element.

Computations for reading the symbol information such as a 1D barcode can be reduced, even when the imaging means described above is a contact-type one-dimensional imaging element. The correlation map creating unit described above particularly calculates correlation between areas neighboring in a direction perpendicular to the scanning direction of the scanning lines in the temporary area, and creates a map showing an area provided with large correlation values. Thus, the position of the recorded symbol information can be identified.

(3) A method to be applied to an apparatus for reading symbol information including: an imaging means for capturing an image of a medium on which symbol information is recorded; an image memory for storing image data of the medium captured by the imaging means; and a position detecting processor for fetching the image data and detecting a position of the symbol information recorded on the medium; the method, in the position detecting processor, including: a first step for calculating a variation of brightness along a scanning direction of scanning lines of the symbol information in a prescribed area of the image data, and judging whether a temporary area has a possibility of corresponding to the symbol information; a second step for calculating correlation between areas neighboring in a direction perpendicular to the scanning direction of the scanning lines in the temporary area, and creating a map showing an area provided with large correlation values; a third step for checking presence of a basic barcode on the correlation map, and labeling an area judged as having the basic barcode; and a fourth step for detecting a position of the symbol information recorded on the medium according to the labeled area.

At least an embodiment of the apparatus for reading symbol information includes: the imaging means, the image memory, and the position detecting processor, as described in item (1) above. The method for the apparatus includes: judging whether a temporary area has a possibility of corresponding to the symbol information (the first step), creating a map showing an area provided with large correlation values (the second step), labeling an area judged as having the basic barcode (the third step), and then detecting a position of the symbol information recorded on the medium (the fourth step). Therefore, computations for reading the symbol information can be reduced.

(4) The method for reading symbol information: wherein the second step calculates the correlation between areas neighboring in a direction perpendicular to the scanning direction of the scanning lines in the temporary area, and then a first case where both the two correlation values are larger than the prescribed threshold and a second case where either of the two correlation values is larger than the prescribed threshold are discriminated from each other to create the correlation map.

At least an embodiment of the second step described above calculates the correlation between areas neighboring in a direction perpendicular to the scanning direction of the scanning lines in the temporary area, and then the first case where both the two correlation values are larger than the prescribed threshold and the second case where either of the two correlation values is larger than the prescribed threshold are discriminated from each other (For example, by applying different points on elements of the correlation map, in the first and second cases) to create the correlation map. Therefore, a middle part in a vertical direction of the symbol information and upper/lower edge parts of the same can be discriminated from each other on the correlation map. Thus, the position of the symbol information can be recognized more accurately.

(5) The method for reading symbol information: wherein, in the third step, an area having both the two correlation values larger than the prescribed threshold is labeled as an area that is judged to include the basic barcode.

In at least an embodiment of the third step, an area having both the two correlation values larger than the prescribed threshold is labeled as an area that is judged to include the basic barcode. Therefore, in position detection by the position determining unit, an area having a higher probability (an area having a high probability of being the symbol information) can be objective for detection so that reading accuracy can consequently be improved.

(6) The method for reading symbol information: wherein in the fourth step; an approximate position of the symbol information recorded on the medium is determined in horizontal and vertical directions according to the labeled area; the total number of labeled elements in a rectangular area formed at the approximate position is counted; a judgment is made on whether or not the total number of labeled elements conforms to a total number of labeled elements, counted beforehand, of the entire correlation map; and subsequently, a position of the symbol information recorded on the medium is detected.

In at least an embodiment of the fourth step described above, an approximate position of the symbol information recorded on the medium is determined in horizontal and vertical directions according to the labeled area; the total number of labeled elements in a rectangular area formed at the approximate position is counted; a judgment is made on whether or not the total number of labeled elements conforms to a total number of labeled elements, counted beforehand, of the entire correlation map; and subsequently, a position of the symbol information recorded on the medium is detected. Therefore, a probability on the approximate position of the symbol information in horizontal and vertical directions can be improved so that reading accuracy can consequently be improved.

(7) The apparatus for reading symbol information: wherein the labeling unit stores a plurality of basic barcode patterns.

At least an embodiment of the labeling unit stores a plurality of basic barcode patterns. Therefore, even when a medium includes multiple kinds of barcodes, the position of the symbol information recorded on the medium can be detected without any differential operation, (8) The method for reading symbol information: wherein, in the third step, the position detecting processor stores a plurality of basic barcode patterns, and searching for the basic barcode pattern is executed while switching the basic barcode pattern from the plurality of basic barcode patterns sequentially.

In at least an embodiment of the third step described above, the position detecting processor stores a plurality of basic barcode patterns, and searching for the basic barcode pattern is executed while switching the basic barcode pattern from the plurality of basic barcode patterns sequentially. Therefore, even when a medium includes multiple kinds of barcodes, each objective barcode can be detected selectively by applying a corresponding basic barcode pattern to the barcode. As a result, the process of reading the symbol information can be simplified, and consequently computations for reading the symbol information can be reduced.

Namely, sometimes in these years, a recording medium includes multiple types of barcodes. In such a case, if complicated process computations are executed for identifying barcode types and positions of the barcode symbols, the process may take much time and the production cost may increase. However, the process of reading the symbol information can be simplified, and consequently computations for reading the symbol information can be reduced.

(9) The method for reading symbol information: wherein the switching order of the plurality of basic barcode patterns changes according to a frequency of barcode appearances.

In at least an embodiment, the switching order of the plurality of basic barcode patterns described above changes according to a frequency of barcode appearances. Therefore, while the required number of basic barcode pattern switching operations being reduced and computations for reading the symbol information being also reduced, efficiency of reading information can be enhanced.

At least an embodiment of apparatus and method for reading symbol information does not need any differential operation, and therefore it can reduce computations required for reading symbol information such as a barcode. Furthermore, even when multiple kinds of barcodes are included in a medium, the apparatus and method can prevent its symbol information reading process from becoming complex, and it can reduce the computations for reading the symbol information.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows binarized data of the map shown in FIG. 5.

FIG. 7 shows a calculation result of correlation of scanning lines positioned vertically.

DETAILED DESCRIPTION OF THE PREFERRED EMBODIMENTS

Embodiments according to the present invention are described below with reference to the accompanying drawings.
(Symbol Information Reading Apparatus)

Figure 1:
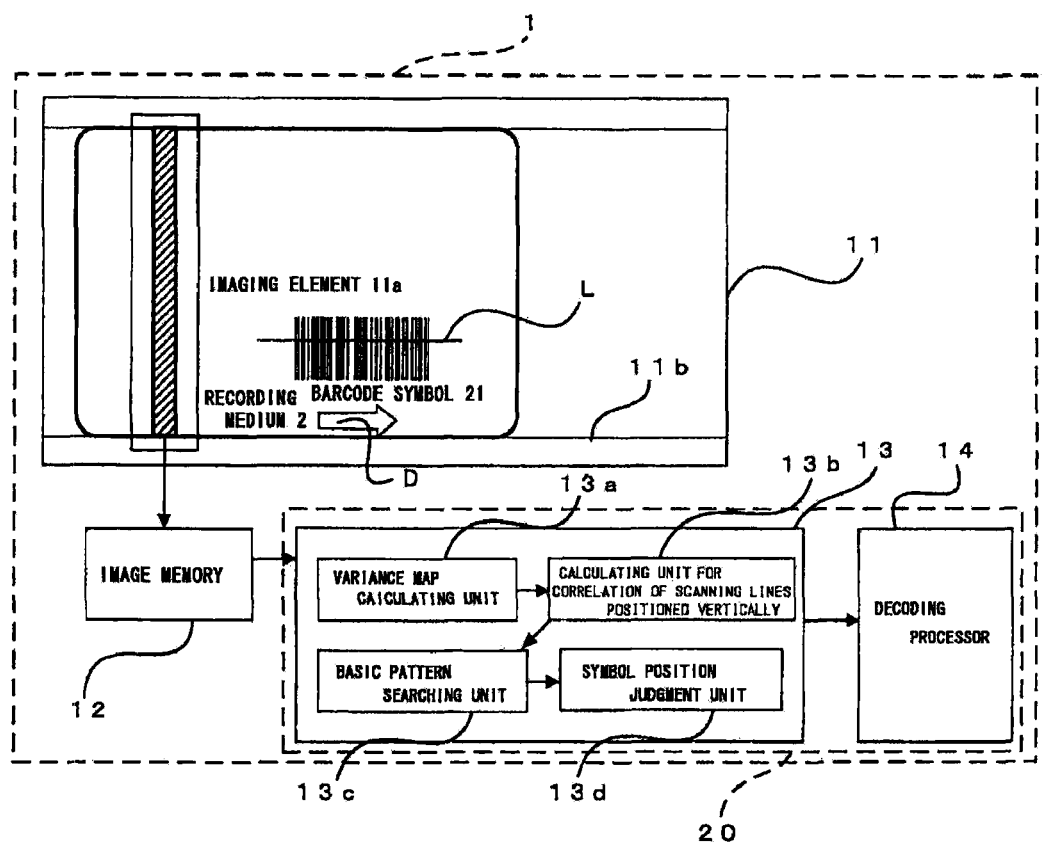
FIG. 1 is a block diagram showing an electrical structure of a symbol information reading apparatus of an embodiment according to the present invention.

FIG. 1 is a block diagram showing an electrical structure of a symbol information reading apparatus 1 of an embodiment according to the present invention.

In FIG. 1, the symbol information reading apparatus 1 includes: an imaging apparatus 11 having a contact-type one-dimensional imaging element 11a and a card transfer mechanism 11b (including transfer guide); an image memory 12; and a data processor 20. The data processor 20 includes a position detecting processor 13 and a decoding processor 14, wherein the position detecting processor 13 has: a variance map calculating unit 13a, a calculating unit for correlation of scanning lines positioned vertically 13b, a basic pattern searching unit 13c, and a symbol position judgment unit 13d. The position detecting processor 13 can be materialized with hardware such as a CPU, a ROM, and a RAM. Though, the position detecting processor 13 and the decoding processor 14 are illustrated as two separate units in the present embodiment, the decoding processor 14 may be included in the position detecting processor 13. In a recording medium 2 such as a card, a 1D barcode symbol 21 is printed as an example of the symbol information. A symbol 'D' shows a transfer direction of the recording medium 2, while a symbol 'L' shows a scanning line for the 1D barcode symbol 21.

By photoelectric conversion, the imaging element 11a of the imaging apparatus 11 takes an image of the barcode symbol 21 printed (recorded) on the recording medium 2. The image memory 12 stores image data of the barcode symbol 21 captured by the imaging element 11a. The data processor 20 fetches the image data of the barcode symbol 21 from the image memory 12, and puts into execution various processing on the captured image data. In the present embodiment, particularly the position detecting processor 13 of the data processor 20 detects a position of the barcode symbol 21 in the recording medium 2.

Described below is a method for reading symbol information of the embodiment according to the present invention in the symbol information reading apparatus 1 having the electrical structure as described above.
(Method for Reading Symbol Information)

Figure 2:
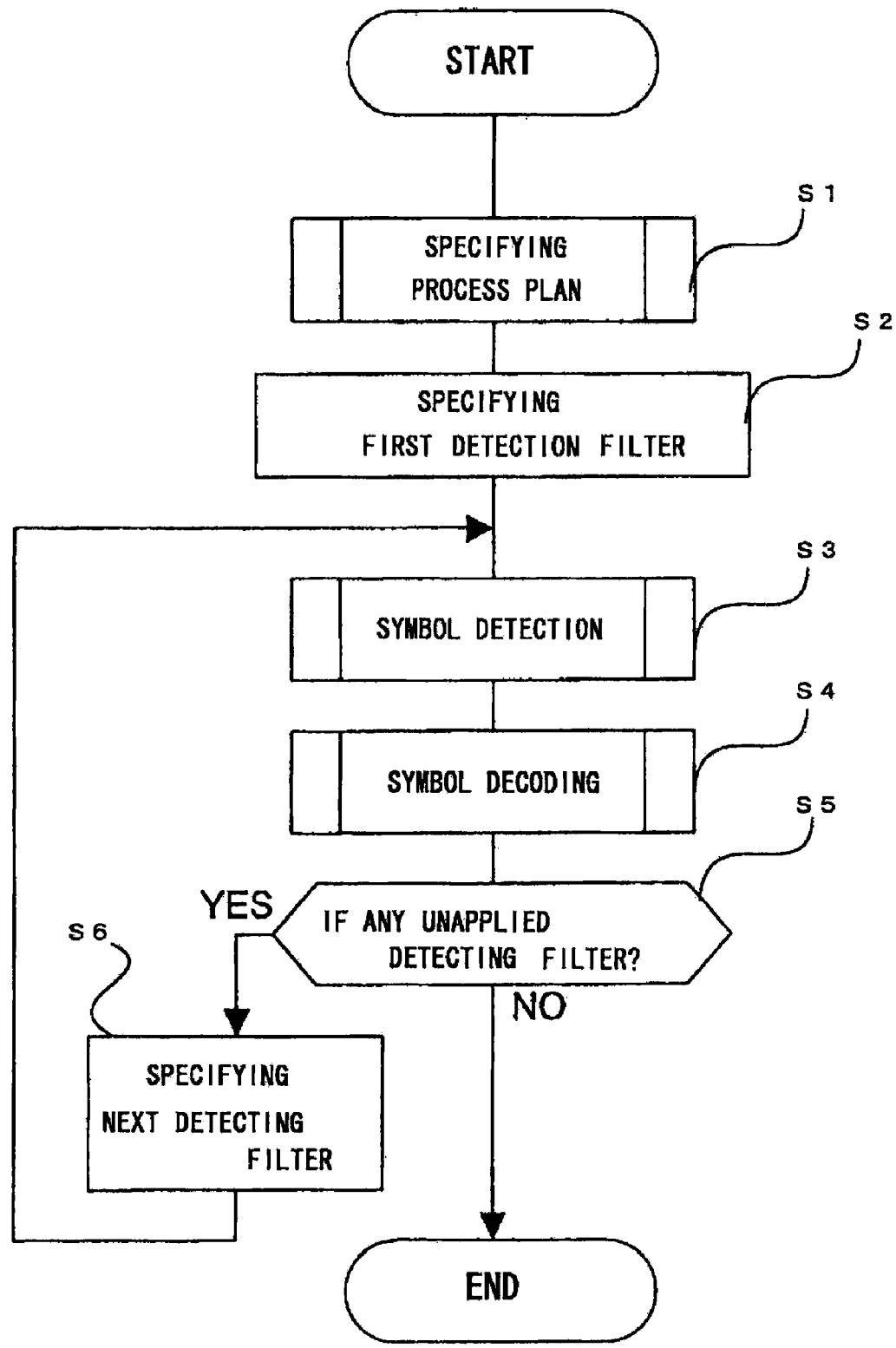
FIG. 2 is a flowchart showing a workflow of a method for reading symbol information of the embodiment according to the present invention.

FIG. 2 is a flowchart showing a workflow of the method for reading symbol information of the embodiment according to the present invention. The workflow of the method for reading symbol information of the embodiment according to the present invention is described below with reference to FIG. 2.

At first, a process plan is specified (Step S1). Specifically, types of barcode detectors (detecting filters) and an applying order are specified according to a barcode type of the barcode recorded on the recording medium 2 or a barcode type of a barcode to be read. Though a first detecting filter (one of basic barcode patterns described later) is specified by default (Step S2), a different order may be applied according to a frequency of barcode appearances for example.

Then, a symbol detection is carried out (Step S3). Specifically, by photoelectric conversion, the imaging element 11a of the symbol information reading apparatus 1 takes an image of the barcode symbol 21 of the recording medium 2 that has moved along the card transfer mechanism 11b (the transfer guide) to a prescribed position. The captured image data of the barcode symbol 21 is stored in the image memory 12. Incidentally, the image memory 12 can be materialized with any of image data storage functions such as a RAM, an SDRAM, a DDRSDRAM, and a RDRAM, as far as it is able to store image data.

Subsequently, the position detecting processor 13 of the data processor 20 reads out the image data stored in the image memory 12. Through processing operations by the variance map calculating unit 13a, the calculating unit for correlation of scanning lines positioned vertically 13b, the basic pattern searching unit 13c, and the symbol position judgment unit 13d; presence of the barcode symbol 21 is determined as a duty of the first detecting filter described above. If the presence is identified, the position is determined. Symbol position judgment unit Then, the decoding processor 14 of the data processor 20 carries out a decoding operation (Step S4). More concretely to describe, the decoding processor 14 of the data processor 20 carries out the decoding operation on the barcode symbol 21 (data decoding along the scanning line 'L') according to the position of the barcode symbol 21 analyzed in Step S3.

If there still remains any other barcode to be detected, or in other words there exists any other detecting filter unapplied (Step S5: YES), a next detecting filter is applied (Step S6) and operation moves to Step S3 for another symbol detection and symbol decoding (Steps S3 and S4). On the other hand, if there is no more detecting filter unapplied (Step S5: NO), the series of reading operations on the symbol information quit. An operation for switching the detecting filter may be carried out for example by either of the basic pattern searching unit 13*c* of the position detecting processor 13 or the decoding processor 14. The applying order of the detecting filters may be specified according to the frequency of barcode appearances for example. These dispositions can increase efficiency of the reading process of symbol information. The present embodiment includes the steps of specifying the process plan (Step S1) and switching the detecting filter (Step S6), considering a possibility that one media may include multiple kinds of barcodes. However, these steps can be eliminated so that namely the process is materialized only with Step 3 and Step 4.

Figure 3:
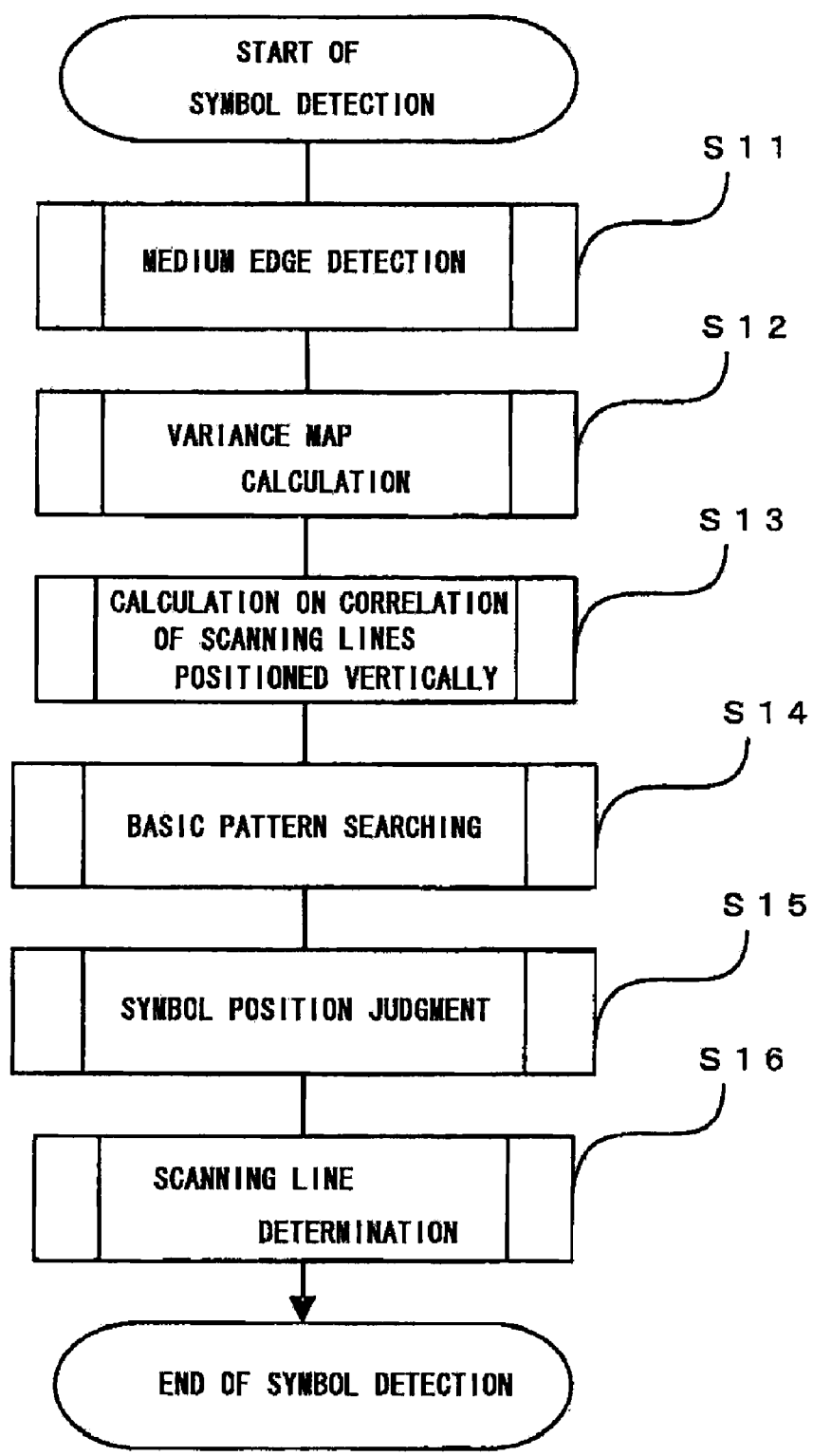
FIG. 3 is a flowchart showing a workflow of information processing in symbol detection Step S3 shown in FIG. 2.

FIG. 3 is a flowchart showing a workflow of information processing in symbol detection by Step S3 shown in FIG. 2.

Figure 4:
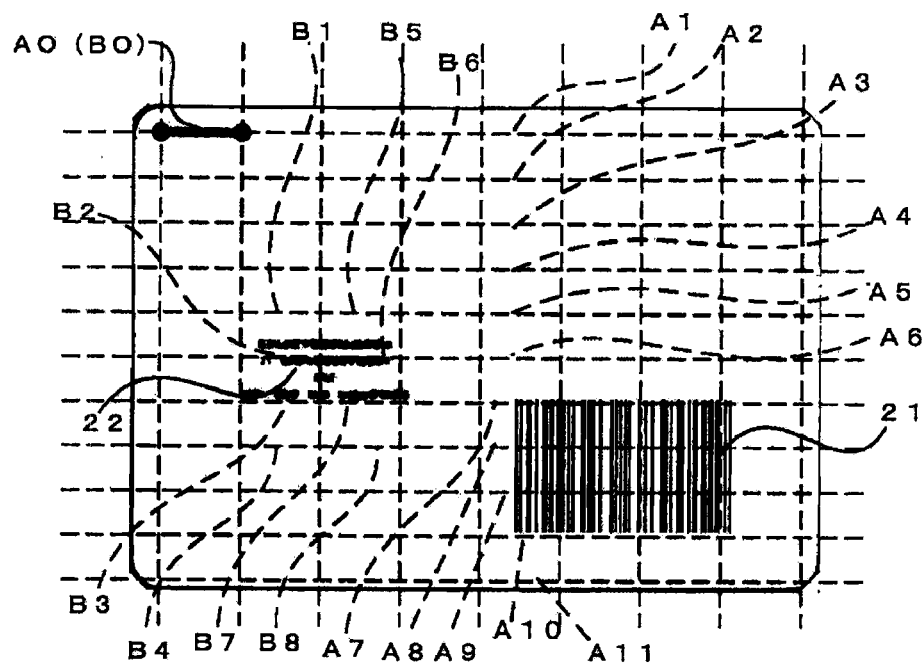
FIG. 4 shows an example of image data of a recording medium stored in an image memory.

In FIG. 3, edge positions at the top, bottom, right, and left of the recording medium 2 are detected at first (Step S11). More concretely to describe, the variance map calculating unit 13*a* detects the edge positions at the top, bottom, right, and left as preprocessing for variance map calculation, using the image data of the recording medium 2 stored in the image memory 12. FIG. 4 shows an example of the image data of the recording medium 2 stored in the image memory 12. In FIG. 4, solid lines outlining the recording medium 2 show the edge positions of the recording medium 2 acquired by edge detection.

Carried out subsequently is variance map calculation (Step S12). More concretely to describe, the variance map calculating unit 13*a* segments the whole image space into a lattice arrangement of small blocks by using the edge lines as baselines as FIG. 4 shows, and calculates a variation of brightness (for example, variance, or standard deviation) along a line in each block. The line in each block is formed in the same direction as a scanning direction of the scanning line 'L' for the barcode symbol 21 shown in FIG. 1, and namely it is for example a line of a symbol 'A0 (B0)' shown in FIG. 4. Conventionally, multiple lines are specified in each block, and inner product calculation is carried out for each corresponding, point after differential operation. Meanwhile, in the method for reading symbol information of the present embodiment, variation (or standard deviation) with respect to each single line is calculated. Therefore, being compared with the conventional technology, the method for reading symbol information of the present embodiment includes less computations.

Figure 5:
FIG. 5 shows map values as an image.

As a result of the same calculation for all the blocks, a map on the amount of variation according to the lattice coordinates can be obtained. FIG. 5 shows the map values as an image. White sections represent blocks having large variation, while black sections represent blocks having small variation. The sections having large variation correspond to a position of the barcode symbol 21 shown in FIG. 4. Binarizing the map of FIG. 5 results in data shown in FIG. 6. As a threshold for binarization, an appropriate value can be specified on the basis of distribution on the amount of variation. FIG. 6 shows binarized data of the map shown in FIG. 5.

FIG. 6 is described below in detail. For example, on the fourth line from the right end, there exists a series of values of [0, 0, 0, 0, 0, 1, 1, 1, 0, 0] from the top (at the section circled with a dotted line 'X'). This section corresponds to the binarized data of the variance on each single line in the blocks of A1 to A11 in FIG. 4 with a prescribed threshold. As shown in FIG. 6, a position corresponding the position of the barcode symbol 21 in FIG. 4 has 9 blocks, which are laid out in a square and each of which is provided with a value '1' (one of the sidelines is A7, A8, and A9 shown in FIG. 4). Thus, the variance map calculating unit 13*a*, which detects the position of the top, bottom, right, and left edges (Step S11 of FIG. 3) and calculates the variance map (See FIGS. 5 & 6) (Step S12 of FIG. 3), functions as an example of "a temporary area judgment unit" that calculates a variation of brightness along a scanning line in a prescribed area of the image data and judges a temporary area having a possibility of corresponding to the symbol information. The "temporary area" described above corresponds to the area including 9 blocks, each of which is provided with a value '1', as described above.

In the map that FIG. 6 shows, parts of the image corresponding to blocks with '1' may have a high probability of conforming to the barcode area, but they are not necessarily the barcode area. In other words, there exists some area that does not include the barcode symbol 21 but has blocks with '1'. Such an area has a chance of being judged as a "temporary area". Concretely to describe, 4 blocks with '1' existing in the section circled with a dotted line 'Y' in FIG. 6 correspond not to the position of the barcode symbol 21 but to a position of characters 22 printed on the surface of the recording medium 2, as FIG. 4 shows.

To solve the problem, calculating operation for correlation of scanning lines positioned vertically is carried out as Step S13 of FIG. 3. The step discriminates the area of the barcode symbol 21 from any others by the calculating unit for correlation of scanning lines positioned vertically 13*b*. More specifically, with respect to each element with '1' on the lattice map, brightness correlation between scanning lines of an objective block and its next upper block as well as the objective block and its next lower block is calculated. If the blocks include the barcode symbol 21, the correlation value must be a large value.

FIG. 7 shows a calculation result of correlation of scanning lines positioned vertically. Specifically to describe, with respect to lines formed along the scanning direction of the scanning lines for the barcode symbol 21; if a correlation value between an objective line and either of its next upper or next lower line is large, the element gets 1 point added. If correlation values between the objective line and both its next upper and next lower lines are large, the element gets 2 points added. One caution to be considered on this occasion is that the objective data is not the data of FIG. 6 (binary data of '0' and '1') but the actual image data shown in FIG. 4.

For example, the scanning lines used for creating the data of the 4 blocks circled with the dotted line 'Y' in FIG. 6 are 4 lines, namely B2, B6, B3, and B7 in FIG. 4. These 4 lines are objective scanning lines on this occasion. When the line B2 is concerned in terms of correlation of scanning lines positioned vertically, a correlation value between B2 and B1 as well as another correlation value between B2 and B3 are calculated. If either of these two values is large enough, 1 point is added. If both the two values are large enough, the element gets 2 points added. These correlation values of any character area are generally not large, being compared with those of an area of the barcode symbol 21 (A threshold, for determining whether a correlation value is large enough or not, is so defined as to make it possible to identity the area of the barcode symbol 21). In the same manner; concerning the line B6 shown in FIG. 4 in terms of correlation of scanning lines positioned vertically, a correlation value between B6 and B5 as well as another correlation value between B6 and B7 are calculated; concerning the line B3 in terms of correlation of scanning lines positioned vertically, a correlation value between B3 and B2 as well as another correlation value between B3 and B4 are calculated; and concerning the line B7 in terms of correlation of scanning lines positioned vertically, a correlation value between B7 and B6 as well as another correlation value between B7 and B8 are calculated. As a result, none of these correlation values are large. Consequently, as a section circled with a dotted line "Y" in FIG. 7 shows, scores of the blocks circled with the dotted line 'Y' in FIG. 6 become all '0'.

In the same manner, the scanning lines used for creating the data of the 9 blocks circled with the dotted line 'Z' in FIG. 7 are 9 lines including an area of the barcode symbol 21 in FIG. 4. For example, 3 lines used for creating the data of the blocks at the left side in the section (a section showing [1, 2, 1] from the top) circled with the dotted line 'Z' in FIG. 7 are 3 lines, namely A7 to A9 in FIG. 4. Concerning the line A7 as an objective line in terms of correlation of scanning lines positioned vertically, a correlation value between A7 and A6 as well as another correlation value between A7 and A8 are calculated. Owing to characteristics of the barcode symbol 21, the correlation value between A7 and A8 is significantly large (being almost close to 1). As a result, 1 point is added. Concerning the line A9 as an objective line, also 1 point is added in the same manner. Concerning the line A8 as an objective line, a correlation value between A8 and A7 as well as another correlation value between A8 and A9 are both large significantly so that 2 points are added. In this way, the data of the blocks at the left side in the section circled with the dotted line 'Z' is determined so as to be [1, 2, 1]. The data of the blocks at the middle in the section circled with the dotted line 'Z' is determined so as to be [1, 2, 1] in the same manner, and the same at the right side is also determined to be [1, 2, 1].

As FIG. 7 shows, an element provided with 2 points means that it has a significant correlation in a vertical direction. Such an element is relevant to characteristics of a barcode in which the same line patterns are vertically stacked, and it is considered to have a high probability of conforming to a barcode area. Thus, the calculating unit for correlation of scanning lines positioned vertically 13b, for calculation on the correlation of scanning lines positioned vertically (Step S13 of FIG. 3), functions as an example of "a correlation map creating unit" that calculates the correlation between areas neighboring in a direction perpendicular to the scanning direction (in the vertical direction in FIGS. 4 and 6) of the scanning lines of the barcode symbol 21 (Refer to the symbol 'L' in FIG. 1) in the temporary area described above, and creates a map showing an area provided with large correlation values. In the present embodiment, as explained by referring to the section circled with the dotted line 'Z' in FIG. 7; the correlation between every two areas neighboring in the vertical direction (i.e., the neighboring lines) is calculated. Then, a first case where both the two correlation values are larger than the prescribed threshold (the first case of adding 2 points) and a second case where either of the two correlation values is larger than the prescribed threshold (the second case of adding 1 point) are discriminated from each other to create a correlation map. Thus, a correlation map can be created for precisely identifying the position where the barcode symbol 21 exists (Refer to FIG. 7).

Figures 8, 9:
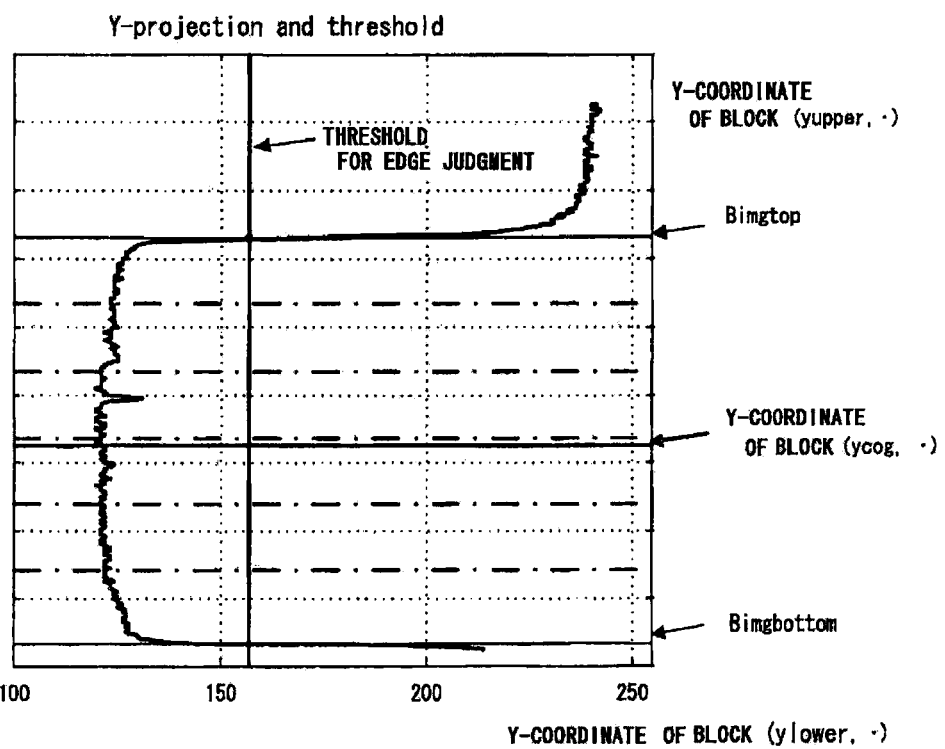
FIG. 8 is a barcode map resulted from the correlation map shown in FIG. 7.
FIG. 9 shows a profile of average brightness in the vicinity of the barcode symbol.

Next, a basic pattern is searched for (Step S14 of FIG. 3). Concretely to describe, presence of a source barcode pattern is checked by using the correlation map. For example, under a condition where a detected minimum barcode size corresponds to a mask pattern (a series of points) of [2, 2, 2] in the scanning direction on the correlation map, searching operation is carried out for the correlation map of FIG. 7. If the mask pattern of [2, 2, 2] is detected, each of map elements occupied by the mask pattern is provided with '1' and any other elements have '0'. Processing operation on the correlation map shown in FIG. 7 results in a barcode map shown in FIG. 8. FIG. 8 is the barcode map resulted from the correlation map shown in FIG. 7. Thus, the basic pattern searching unit 13c for operation of basic pattern searching (Step S14 of FIG. 3) functions as an example of "a labeling unit" that checks presence of a basic barcode (the mask pattern [2, 2, 2] described above on the present embodiment) on the correlation map, and labels an area judged as having the basic barcode (providing each of the map elements with '1').

Though the present embodiment adopts a mask pattern including 3 elements, various other types of basic barcodes (basic barcode patterns) can be applied, such as a mask pattern including 4 elements in a line, and a mask pattern including 6 elements laid out: 3 of them in upper line and in lower line each. Furthermore, in the present embodiment, the correlation between areas neighboring (i.e., neighboring lines) in a direction perpendicular to the scanning direction of the scanning lines is calculated with respect to an objective line. Then, an area having both the two correlation values larger than the prescribed threshold is labeled as an area that is judged to include the basic barcode. Therefore, with any character area being excluded appropriately, an area having a higher probability (only the area where the barcode symbol 21 exists) can be objective for searching operation.

The basic pattern searching unit 13c of the position detecting processor 13 stores at least one basic barcode pattern (detecting filter). Then, the basic barcode pattern is switched sequentially in a series of symbol information reading operations as already described with reference to the flowchart of FIG. 2 (Steps S5 and S6 in FIG. 2). Consequently, the basic pattern searching unit 13c executes the basic pattern searching by using a plurality of barcode patterns.

Next, a symbol position judgment is made (Step S15 of FIG. 3). Concretely to describe, the judgment operation starts with calculation on the center of gravity of the barcode map (ycog, xcog) by the symbol position judgment unit 13d (the center of gravity is calculated according to the common definition). Subsequently, edge positions at the right, left, top, and bottom of the barcode are calculated. The left and right edge positions are detected within a horizontal extent as 'xstart' and 'xstop', at which the sum of the elements becomes 0 (the range for addition is 'ycog±2') and then the detection quits, using 'xcog' as the start point on the barcode map. The top and bottom edge positions are detected within a vertical extent as 'yupper' and 'ylower', at which the sum of the elements becomes 0 (the range for addition is [xstart, xstop]) and then the detection quits, using 'ycog' as the start point on the barcode map. Thus, 4 sideline positions of the barcode are identified on the lattice coordinate system. Then, coordinates in an image space are calculated according to the coordinates of the 4 sidelines. Each lattice block has corresponding relation to the image space, and a left edge of the barcode 'BCDL' is a block start point at a block (ycog, xstart). Meanwhile, a right edge of the barcode 'BCDR' is a block end point at a block (ycog, xstop). Therefore, the horizontal extent of the barcode is from 'BCDL' to 'BCDR'. Incidentally, the horizontal extent can be expanded for a distance of a certain number of pixels as a margin to the right and left directions. Upper and lower edge positions of the barcode in the image space are calculated according to a profile of average brightness within an area sandwiched by the y-coordinate of a block (yupper, xcog) and the y-coordinate of a block (ylower, xcog). FIG. 9 specifically shows an example (When profiles are calculated for all areas without using the barcode map shown in FIG. 8, a certain amount of computation and calculation time is required).

FIG. 9 shows a profile of average brightness in the vicinity of the barcode symbol 21. As shown in FIG. 9, a start point of searching for top and bottom edges is located at the y-coordinate of the block of the center of gravity, and a threshold for edge identification is determined according to the brightness of the block (Refer to FIG. 9). In searching for edges in a vertical direction, edges are determined as 'Bimgtop' and 'Bimgbottom' at each corresponding positions where the brightness exceeds the threshold. Thus, a position of the barcode in the image space can be determined. Finally, scanning lines are determined (Step S16 in FIG. 3). In an example shown in FIG. 9, an extent from 'Bimgtop' to 'Bimgbottom' is equally divided into 6 sections for scanning on 5 lines (dashed lines in the figure) in the barcode symbol 21.

Thus, the symbol position judgment unit 13d functions as an example of "a position determining unit" that detects a position of the barcode symbol 21 recorded on the recording medium 2 according to the area labeled as shown in FIG. 8. Furthermore, as a function of the symbol position judgment unit 13d, it is also possible for example; to determine an approximate position of the barcode symbol 21 recorded on the recording medium 2, in horizontal and vertical directions according to the labeled area; to count the total number of labeled elements in a rectangular area formed at the approximate position; to make a judgment whether or not the total number of labeled elements conforms to a total number of labeled elements, counted beforehand, of the entire correlation map; and subsequently to detect a position of the barcode symbol 21 recorded on the recording medium 2. As a result, accuracy of the approximate position in horizontal and vertical directions can be improved.

PRIMARY ADVANTAGEOUS EFFECT OF THE EMBODIMENT

As described above, the method for reading symbol information of the present embodiment includes: the first step (Step S12 of FIG. 3) for calculating the variation (variance, in this case) along the scanning direction of scanning lines of symbol information in the prescribed area of the image, and judging whether or not the area has a possibility of corresponding to the barcode area according to the level of the variance; the second step (Step S13 of FIG. 3) for calculating a correlation between scanning lines of local areas neighboring each other vertically in the area judged to have a possibility of corresponding to the barcode area, and providing a score to the area having a large correlation value; the third step (Step S14 of FIG. 3) for checking if any score array pattern corresponding to the minimum barcode symbol to be detected exists in the score map, and labeling the area in the map conforming to the score array pattern; and the fourth step (Step S15 of FIG. 3) for determining an approximate position of the barcode symbol 21 in horizontal and vertical directions according to the labeling pattern in the map, and ultimately determining a position of the barcode symbol 21 in the horizontal and vertical directions on the image space coordinate system according to information on the approximate position. Therefore, the position of the barcode symbol 21 in the horizontal and vertical directions can be determined without any differential operation, and consequently computations can be reduced. Furthermore, when sufficient operation speed is obtained even with an inexpensive imaging element, using such an inexpensive imaging element instead of an expensive one can contribute to reduction of the production cost.

In the second step described above, calculation of the correlation between the scanning lines formed along the scanning direction of the scanning lines of the local areas neighboring each other provides 1 point if a correlation value between an objective line and only either of its next upper or next lower line is large, while it provides 2 points if correlation values between the objective line and both its next upper and next lower lines are large. Accordingly, an effect at upper and lower ends of the barcode symbol 21 (i.e., an effect at the upper and lower ends having a smaller correlation value) can be applied.

In the third step described above, the elements provided with 2 points on the map of the minimum barcode symbol pattern are limitedly applied, and therefore an area having a higher probability can be objective for searching operation In the fourth step described above, it is possible to count the total number of labeled elements in a rectangular area formed at the approximate position determined in horizontal and vertical directions, and to check whether or not the total number of labeled elements conforms to a total number of labeled elements, counted beforehand, of the entire map. Accordingly, a probability on the approximate position of the symbol information in horizontal and vertical directions can be enhanced.

APPLICATION EXAMPLE

Figures 10, 11:
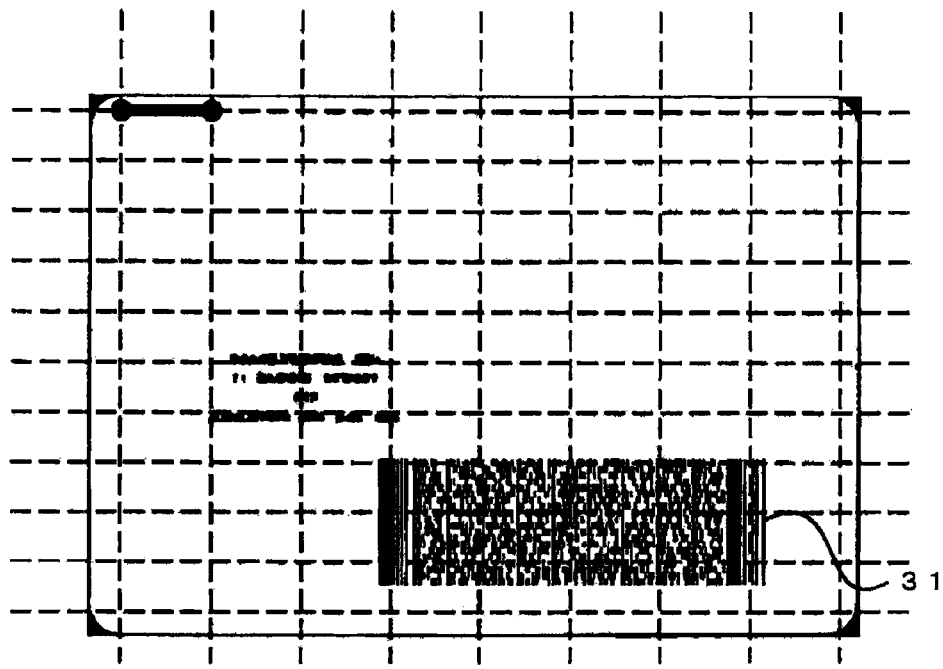
FIG. 10 shows an example of a medium on which a 2D barcode is printed.
FIG. 11 shows a correlation map resulted from applying the processing steps of position detection to the image shown in FIG. 10.

The present invention can also be applied to position detection for the typical 2D barcode, PDF417. FIG. 10 shows an example of an image on a medium on which a 2D barcode 31 is printed. Applying the processing steps of position detection described above to the image shown in FIG. 10 results in a correlation map of scanning lines as FIG. 11 shows. Though elements having 2 points appear in the entire symbol area in the case of 1D barcode (See FIG. 7); in the correlation map of FIG. 11, only the elements corresponding to right and left ends of the barcode have 2 points and the elements in the middle of the barcode have 0 points. In the case of 2D barcode, the process described above for searching for the mask pattern cannot detect the 2D barcode. Therefore, searching operation for a 1D barcode is once terminated, and searching operation assuming a 2D barcode starting with the correlation map is executed. In other words, a couple of similar patterns at the right and left ends are searched for in the correlation map. After the patterns are once detected, mapping is executed for the rectangular area sandwiched between the patterns on the image space coordinate system so as to determine a barcode position according to characteristics of the 2D barcode.

Figures 12, 13:
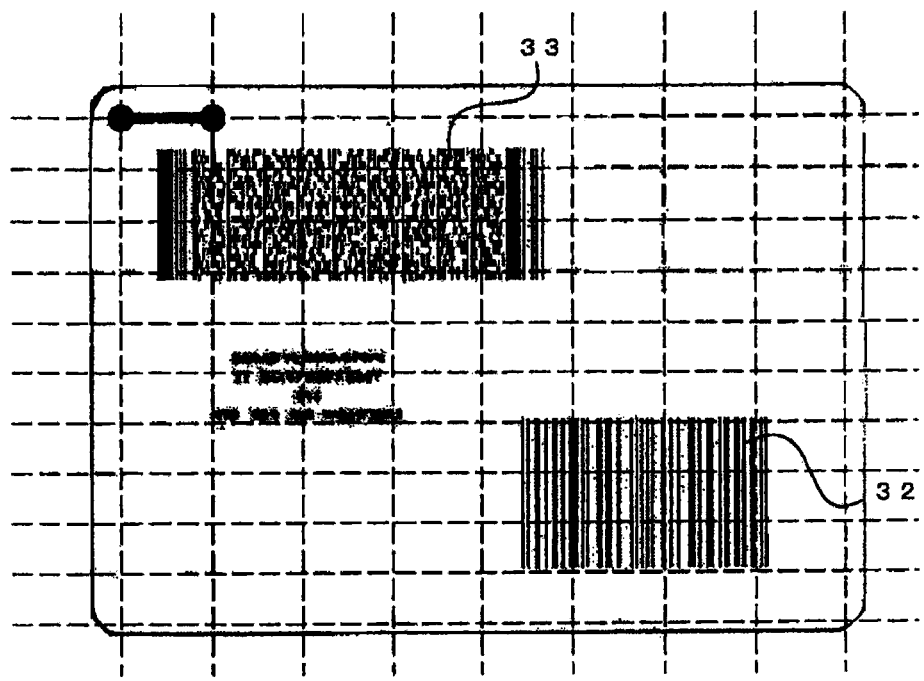
FIG. 12 shows an example of multiple kinds of barcodes used on a medium.
FIG. 13 shows a correlation map acquired according to FIG. 12.

FIG. 12 shows an example of multiple kinds of barcodes used on a medium. As shown in FIG. 12, the medium includes a 1D barcode CODE128 (shown with a numeral 32) and a 2D barcode PDF417 (shown with a numeral 33). A symbol detector for each type of barcode is prepared in advance, and a first symbol detector for CODE128 is used at first for an input image. A correlation map for FIG. 12, corresponding to FIG. 7 described above, is as shown in FIG. 13. FIG. 13 shows the correlation map acquired according to FIG. 12. Applying the mask pattern [2, 2, 2] to the correlation map FIG. 13 creates a barcode map for CODE128, corresponding to FIG. 8 described above, to detect presence of CODE128. Afterward, according to the barcode map, a position of the symbol CODE128 in the image space is determined, and then decoding operation follows.

Subsequently, a second symbol detector for PDF417 is used for the same input image. As parameters for the detector, dimensions of a lattice block are set to be suitable for a shape of PDF417. In this case, the same lattice block as for CODE128 is used. Accordingly, a correlation map is created, as shown in FIG. 13 described above. Though the 1D barcode includes elements having 2 points in the entire symbol area; in the barcode PDF417, only the elements corresponding to right and left ends of the barcode have 2 points and the elements in the middle of the barcode have 0 points. Then, for the barcode PDF417, searching operation assuming a 2D barcode is executed. In other words, a couple of similar patterns at the right and left ends are searched for in the correlation map. After the patterns are once detected, mapping is executed for the rectangular area sandwiched between the patterns on the image space coordinate system so as to determine a barcode position according to characteristics of the 2D barcode, and then decoding operation follows.

In this embodiment, the present invention is applied for a combination of a 1D imaging element and a linear transfer mechanism. However, the present invention is not limited to the embodiment. The present invention also may be applied to, for example, a combination of an area sensor such as a two-dimensional CCD, a CMO imager, etc. and an objective medium supporting mechanism as well as another combination of one-dimensional imaging element and a manual medium driving mechanism.

In the above modification example, the barcode label includes a PDF417 format. However, the present invention is not limited to the format. For example, a barcode label may include any other barcode of the stack-type, such as Code49, and others.

INDUSTRIAL APPLICABILITY

Thus, embodiments apparatus and method for reading symbol information according to the present invention enable reduction of computations required for reading symbol information.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus for reading symbol information comprising:
    an imaging element structured to capture an image of a medium on which symbol information is recorded;
    an image memory structured to store image data of the medium captured by the imaging element; and
    a position detecting processor structured to fetch the image data and structured to detect a position of the symbol information recorded on the medium;
    wherein the position detecting processor comprises:
    a temporary area judgment unit structured to segment a whole image space into a lattice arrangement of small blocks and calculate a variation of brightness along a scanning direction of scanning lines of the symbol information in each of the small blocks of the image data, and structured to judge a temporary area having a possibility of corresponding to the symbol information;
    a correlation map creating unit that structured to calculate correlation between areas neighboring in a direction perpendicular to the scanning direction of the scanning lines in the temporary area, and structured to create a map showing an area provided with a case where both of two neighboring correlation values in the direction perpendicular to the scanning direction are larger than a prescribed threshold;
    a labeling unit that structured to check presence of a basic barcode on the correlation map, and structured to label an area judged as having the basic barcode; and
    a position determining unit that structured to detect a position of the symbol information recorded on the medium according to the labeled area.

2. The apparatus for reading symbol information according to claim 1
    wherein the imaging element is a contact-type one-dimensional imaging element.

3. The apparatus for reading symbol information according to claim 1
    wherein the labeling unit is structured to store a plurality of basic barcode patterns.

4. The apparatus for reading symbol information according to claim 1, wherein the correlation map of the correlation map creating unit further shows a second case where either of the two neighboring correlation values is larger than the prescribed threshold.

5. A method to be applied for reading symbol information recorded on a medium using an apparatus comprising: an imaging element structured to capture an image of the medium on which the symbol information is recorded; an image memory structured to store image data of the medium captured by the imaging element; and a position detecting processor structured to fetch the image data and structured to detect a position of the symbol information recorded on the medium; the method comprising:
    segmenting a whole image space into a lattice arrangement of small blocks;
    calculating a variation of brightness along a scanning direction of scanning lines of the symbol information in each of the small blocks of the image data;
    judging whether a temporary area has a possibility of corresponding to the symbol information;
    calculating correlation between areas neighboring in a direction perpendicular to the scanning direction of the scanning lines in the temporary area;
    creating a correlation map showing an area provided with a case where both of two neighboring correlation values in the direction perpendicular to the scanning direction are larger than a prescribed threshold;
    checking presence of a basic barcode on the correlation map;
    labeling an area judged as having the basic barcode; and
    detecting a position of the symbol information recorded on the medium according to the labeled area.

6. The method for reading symbol information according to claim 5
    wherein in the creating the correlation map, the correlation map further shows an area provided with a second case where either of the two neighboring correlation values in the direction perpendicular to the scanning direction is larger than the prescribed threshold.

7. The method for reading symbol information according to claim 6
    wherein, in the checking presence of a basic barcode, an area having both the two correlation values larger than the prescribed threshold is labeled as an area that is judged to include the basic barcode.

8. The method for reading symbol information according to claim 5
    wherein, in the detecting a position of the symbol information; an approximate position of the symbol information recorded on the medium is determined in horizontal and vertical directions according to the labeled area; the total number of labeled elements in a rectangular area formed at the approximate position is counted; a judgment is made on whether or not the total number of labeled elements conforms to a total number of labeled elements, counted beforehand, of the entire correlation map; and subsequently, a position of the symbol information recorded on the medium is detected.

9. The method for reading symbol information according to claim 5
    wherein, in the checking presence of a basic barcode, the position detecting processor stores a plurality of basic barcode patterns, and searching for the basic barcode pattern is executed while switching the basic barcode pattern from the plurality of basic barcode patterns sequentially.

10. The method for reading symbol information according to claim 9
    wherein the switching order of the plurality of basic barcode patterns changes according to a frequency of barcode appearances.

* * * * *